United States Patent [19]

Kobayashi et al.

[11] Patent Number: 4,679,056

[45] Date of Patent: Jul. 7, 1987

[54] THERMAL HEAD WITH INVERTIBLE HEATING RESISTORS

[75] Inventors: Mikiya Kobayashi, Sagamihara; Takeshi Nakada, Chiba; Michio Arai, Koganei, all of Japan

[73] Assignee: TDK Corporation, Tokyo, Japan

[21] Appl. No.: 780,290

[22] Filed: Sep. 26, 1985

[30] Foreign Application Priority Data

Oct. 4, 1984 [JP] Japan ................................ 59-207097

[51] Int. Cl.[4] ........................ G01D 15/10; H01C 7/10; H05B 1/02

[52] U.S. Cl. ............................ 346/76 PH; 338/22 R; 219/216; 219/504; 219/505

[58] Field of Search ............ 346/76 PH; 219/216 PH, 219/504, 505, 553; 338/22 SD, 22 R

[56] References Cited

U.S. PATENT DOCUMENTS 4,097,718 6/1978 Weise .................................. 219/505
4,316,080 2/1982 Wroldewski ........................ 219/504
4,413,170 11/1983 Val et al. ............................ 219/505

*Primary Examiner*—E. A. Goldberg
*Assistant Examiner*—Mark Reinhart
*Attorney, Agent, or Firm*—Oblon, Fisher, Spivak, McClelland & Maier

[57] ABSTRACT

A thermal head comprising heating resistors with their temperature coefficient of resistance being negative at normal temperature and invertible to be positive as the temperature rises.

4 Claims, 6 Drawing Figures

FIGURE 4
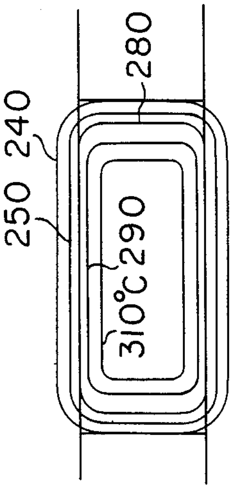
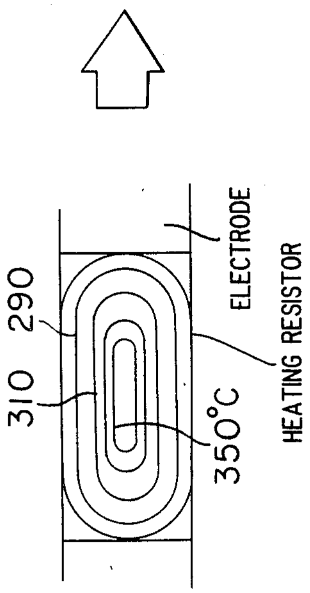
FIGURE 3

THERMAL HEAD WITH INVERTIBLE HEATING RESISTORS

BACKGROUND OF THE INVENTION

1. Field of the Invention

The present invention relates to a thermal head comprising heating resistors, particularly to a thermal head having high printing efficiency and reliability.

2. Description of the Prior Art

Thermal heads are widely used for various heat-sensitive recording systems. A thermal head comprises a substrate and a plurality of heating resistors formed on the substrate and constituting printing elements or dots, and is designed so that the printing elements can be heated in any optional combination by applying an electrical current selectively thereto.

The heating resistors of the thermal heads which have been commonly employed, are made of metals, oxides or other compounds, such as TaN, Ta-Si, Ta-SiO or Cr-SiO. However, in most of these heating resistors, the temperature coefficient of resistance (TCR) tends to decrease at a high temperature, and in many cases, if an electric power is applied excessively, reckless overheating takes place at a high temperature, thus leading to the destruction of the heating resistors. Further, when an electric current is applied to a heating resistor, there is a general tendency that the central portion is heated to a higher temperature than the peripheral portion since the peripheral portion releases the heat more quickly than the central portion. If the temperature coefficient of resistance decreases at a high temperature, as mentioned above, the temperature at the center portion becomes even higher, and the temperature distribution on the surface of the heating resistor becomes uneven, whereby the useful life of the heating resistor will be shortened, and the printing efficiency will be poor. As a technique to overcome the above drawbacks, it has been proposed that a slender strip of a heating resistor is formed in a zigzag fashion so that every portion has the same surface density. However, the surface area of a printing element (a dot) is presently about $100 \times 200$ μm, and in order to form a strip of about 30 μm, an etching technique with high precision is required. Further, with this method, it will be very difficult to realize a high resolving power such as 16 dots/mm$^2$ in a prospective future.

Under the circumstances, the present inventors considered that in order to avoid such difficulties, it was necessary to improve the material for the heating resistors, and have conducted extensive researches to reach the present invention.

SUMMARY OF THE INVENTION

An object of the present invention is to provide a thermal head comprising heating resistors whereby overheating can be controlled while the temperature rise is quick. Another object of the present invention is to provide a thermal head comprising heating resistors whereby the temperature distribution is uniform.

Thus, the present invention provides a thermal head comprising heating resistors with their temperature coefficient of resistance being negative at normal temperature and invertible to be positive as the temperature rises.

BRIEF DESCRIPTION OF THE DRAWINGS

FIG. 3 is a view illustrating the temperature distribution of a heating resistor of a conventional thermal head.

FIG. 4 is a view illustrating the temperature distribution of a heating resistor of the present invention.

DETAILED DESCRIPTION OF THE INVENTION

The present invention provides a thermal head made of a material wherein the temperature coefficient of resistance of the heating resistors, is inverted from negative to positive as the temperature rises. Preferably, the average temperature coefficient of resistance is from $-500$ to 0 ppm/° C. for 25°-150° C. and from 100 to 500 ppm/° C. for 25°-300° C., whereby superior effects can be obtained. For instance, a boron-doped polysilicone layer may be mentioned as a material which satisfies the above-mentioned average temperature coefficients of resistance. The concentration of boron to be doped on a polysilicone is usually from $10^{17}$ to $10^{20}$/cm$^3$, preferably from $10^{17}$ to $10^{19}$/cm$^3$. The boron-doped polysilicone is a preferred heating resistor. However, the present invention is not restricted to the use of this particular material, and any other material may be employed so long as the technical concept of the present invention can be thereby satisfied.

According to the present invention, the heating resistor has a negative temperature coefficient of resistance at a low temperature side, whereby the heating proceeds swiftly or the temperature rises quickly. When the temperature exceeds a predetermined thermal transfer temperature, the temperature coefficient of resistance turns to be positive, whereby the electric current is automatically controlled to limit the temperature rise. Further, the temperature distribution on the surface of the heating resistor tends to be uniform over the entire surface since the temperature rise is controlled at a high temperature portion, whereby excellent printing properties will be given. Now, the present invention will be described in further detail with respect to a thermal head wherein a boron-doped polysilicone is used as the heating resistors. However, it should be understood that the present invention can likewise be accomplished by using heating resistors made of other material.

Figure 1:
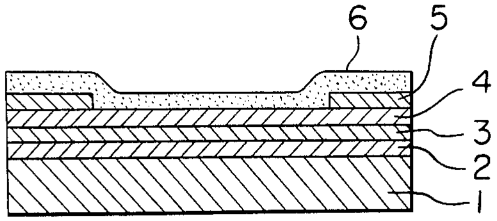
FIG. 1 is a cross-sectional view illustrating a general structure of a thermal head.

FIG. 1 shows a structure of one of a plurality of printing elements of a typical thermal head. On a metal substrate 1 made of e.g. aluminum or iron, an alumina layer 2 and a glazing layer (regenerating layer) 3 are formed. A heating resistor 4 is formed thereon, and an electrode 5 is formed on each end. An abrasion-resistant protective layer (SiC, $Ta_2O_5$, $Si_3N_4$, etc.) 6 is formed thereon. A single printing element has a surface area of about 100×200 μm, or the surface area may be smaller.

The heating resistors of the present invention are made of a material having an average temperature coefficient of resistance which is negative at a low temperature (room temperature) and invertible to be positive as the temperature rises. Here, the average temperature coefficient of resistance (TCR) is represented by $TCR=(R_T-R_{25})/R_{25}(T-25)$ where $R_{25}$ is the resistance at 25° C., and $R_T$ is the resistance at a temperature of T° C. As heating resistors which satisfy the requirements for the above average temperature coefficient of resistance of the present invention, there may be mentioned a boron-doped polysilicone. However, any other materials may be employed as heating resistors of the present invention so long as the above requirements are satisfied.

Figure 2:
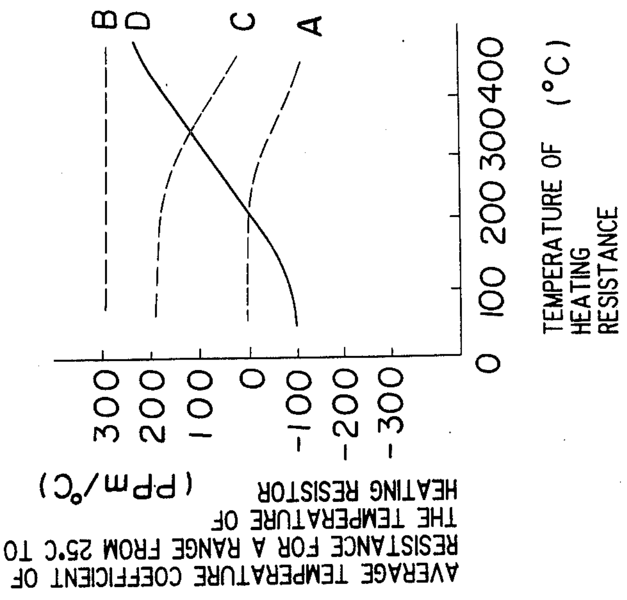
FIG. 2 is a graph shcwing the average temperature coefficients of resistance of an example of a heating resistor suitable for the thermal head of the present invention and some examples of conventional heating resistors.

The functional principle of the heating resistors of the thermal head of the present invention will be described in comparison with conventional heating resistors with reference to FIG. 2. In the FIG., A, B and C indicate the average temperature coefficients of resistance (TCR) of conventional heating resistors $Ta_2N$, Ta-SiO and Ta-Si, respectively, and D indicates the average temperature coefficient of resistance of a boron-doped polysilicone having a boron concentration of $10^{18}/cm^3$.

In the case of conventional example A, TCR decreases as the temperature rises. Consequently, the heat value increases as the temperature becomes higher, whereby the central portion of the printing element of the thermal head tends to have a higher temperature. With respect to the heating resistor of conventional example A having a surface area of 100×200 μm, the temperature distribution was measured. The temperature distribution thereby obtained is shown in FIG. 3. In the area having a temperature of at least 300° C. in the vicinity of the central portion, TCR becomes negative, the temperature of that region tends to further increase, and unless the electric power is controlled, reckless overheating takes place whereby the deterioration of the properties or destruction is likely to be led. In the case of the conventional examples B and C, there is a problem that the temperature rise is slow at a low temperature side.

Whereas, example D of the present invention (a boron-doped polysilicone) has a negative TCR up to about 200° C., and will have a positive TCR at a higher temperature, whereby at the lower temperature side, the heat generation takes place rapidly, and the temperature rise is accelerated, and at a higher temperature, the resistance increases, the heat generation decreases and the upper limit of the temperature is controlled. Consequently, the temperature distribution on the surface of the printing element tends to be uniform, whereby the printing efficiency will be improved. FIG. 4 shows the surface temperature distribution as measured with respect to example D of the present invention. The temperature distribution was measured by means of an infrared radiation thermometer.

Thus, the heating resistors in a thermal head of the present invention are made of a material having a negative average temperature coefficient of resistance at a low temperature (room temperature) side and a positive average temperature coefficient of resistance at a high temperature side, whereby it is possible to attain quick temperature rise and constant and uniform printing temperature. The electric resistance increment characteristics may vary depending upon the particular purposes. However, when the temperature rise of the thermal head is from 350° to 400° C., it is preferred that TCR = −500 to 0 ppm/° C. for 25°-150° C. and TCR = 100 to 500 ppm/° C. for 25°-300° C.

Figure 5:
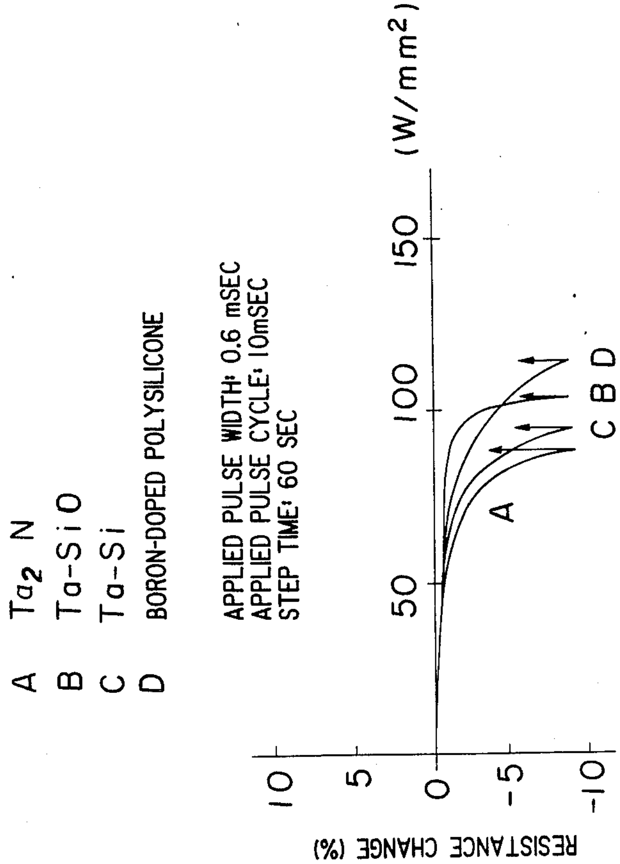
FIG. 5 is a graph showing the crack-resistance properties of an example of a heating resistor of the present invention and some examples of conventional heating resistors.

As mentioned above, the temperature coefficient of resistance of the heating resistors relates to the temperature rise efficiency, the upper limit temperature and the temperature distribution of the heating resistors, and it is evident that the temperature coefficient of resistance also relates to the useful life of the heating resistors. FIG. 5 shows the results of the measurement of the cracking characteristics of samples A, B and C of conventional heating resistors and sample D of the present invention by a step stress test. The applied pulse width was 0.6 m.sec., the applied pulse cycle was 10 m.sec., and the step time was 60 seconds. In samples A and C, the change of the resistance was great, and the stress resistance was poor. Sample B has good stability, but the stress resistance was slightly inferior. Whereas, sample D of the present invention had high stability and stress resistance.

Now, the boron-doped polysilicone will be described which is suitable for use as the heating resistors for the thermal head of the present invention. This material is produced by LPCVD method, and is a polysilicone layer containing boron at a concentration of from $10^{17}$ to $10^{20}/cm^3$. If the boron concentration is lower than $10^{17}/cm^3$, the resistivity tends to be too high, and the desired level of resistance (from 200 to 600Ω) will not be obtained unless the layer thickness is made thick. On the other hand, if the boron concentration is higher than $10^{20}/cm^3$, it becomes difficult to obtain a negative temperature coefficient of resistance at a low temperature side. Within the above-mentioned range, it is possible to design a heating resistor having any desired level of a temperature coefficient of resistance.

The boron-doped polysilicone layer may be prepared by LPCVD method under such conditions that, for instance, hydrogen and helium are used as carrier gases, 5% $B_2H_6/H_2$ and 20% $SiH_4/He$ are used as source gases, and the layer forming is conducted under a pressure of 0.55 Torr at a substrate temperature of 620° C. It is possible to obtain a polysilicone having a desired level of the boron concentration by controlling the flow rates of the source gases, the ratio or other parameters.

Figure 6:
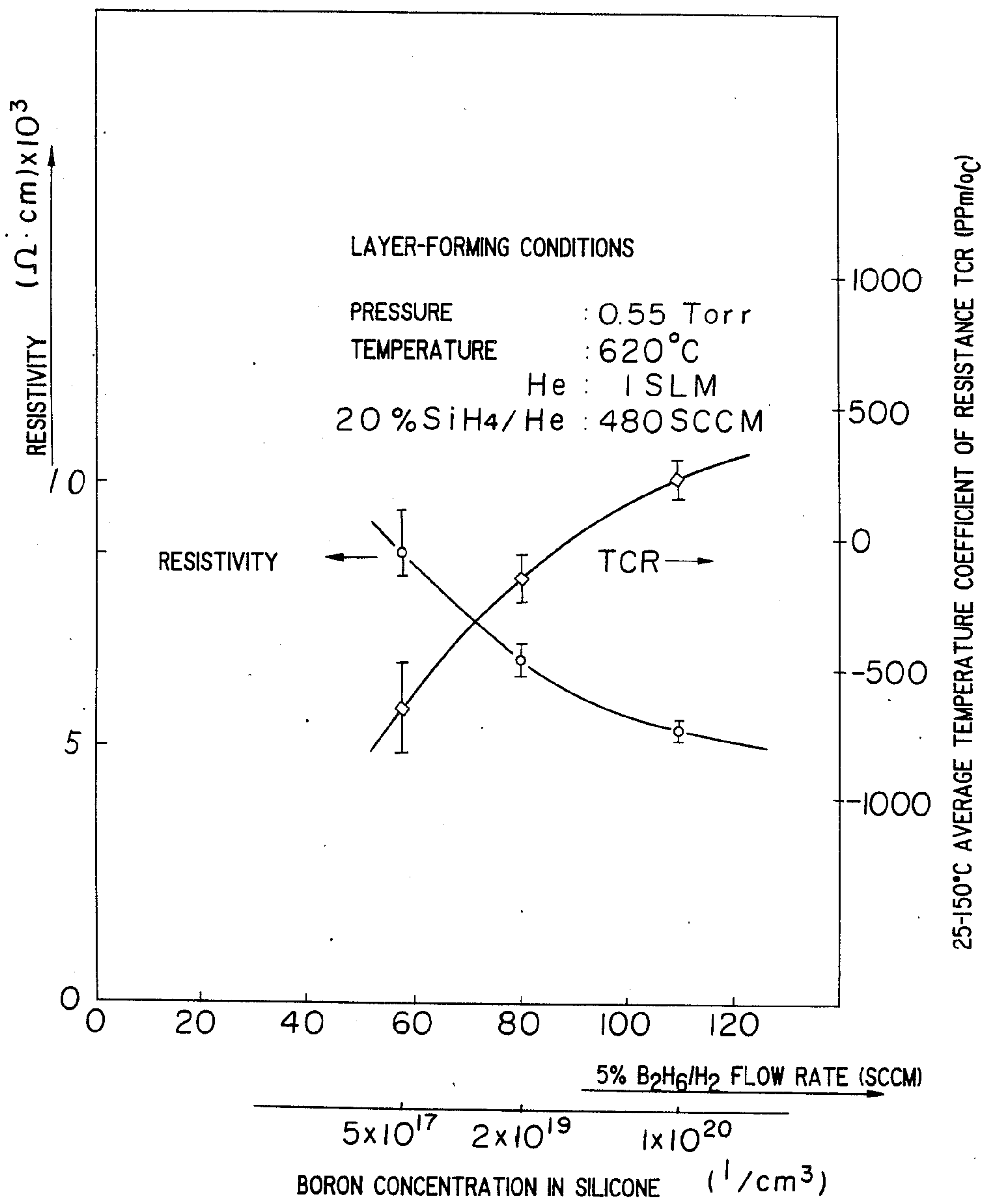
FIG. 6 is a graph showing certain properties of the boron-doped polysilicone suitable for use as a heating resistor for the thermal head of the present invention.

Some properties of the boron-doped polysilicone heating resistors useful in the present invention are shown in the graph of FIG. 6.

What is claimed is:

1. A thermal head comprising heating resistors with their temperature coefficient of resistance being negative at normal temperature and invertible to be positive as the temperature rises, wherein the temperature coefficient of resistance of the heating resistors is from −500 to 0 ppm/° C. for 25°-150° C. and from 100 to 500 ppm/° C. for 25°-300° C., as represented by the average temperature coefficient of resistance.

2. The thermal head according to claim 1, wherein the heating resistors are made of a boron-doped polysilicone.

3. The thermal head according to claim 2, wherein said polysilicone contains boron at a concentration of from $10^{+17}$ to $10^{+20}/cm^3$.

4. A thermal head comprising heating resistors with their temperature coefficient of resistance being negative at normal temperature and invertible to be positive as the temperature rises, wherein the heating resistors are made of a boron-doped polysilicone containing boron at a concentration of from $10^{+17}$ to $10^{+20}/cm^3$.

* * * * *